UNITED STATES PATENT OFFICE.

KARL SCHIRMACHER, OF HÖCHST-ON-THE-MAIN, GERMANY, ASSIGNOR TO THE FARBWERKE, VORM. MEISTER, LUCIUS & BRÜNING, OF SAME PLACE.

WOOL-DYE AND PROCESS OF MAKING SAME.

SPECIFICATION forming part of Letters Patent No. 672,714, dated April 23, 1901.

Application filed July 21, 1900. Serial No. 24,388. (Specimens.)

*To all whom it may concern:*

Be it known that I, KARL SCHIRMACHER, a citizen of the Empire of Germany, residing at Höchst-on-the-Main, Germany, have invented certain new and useful Improvements in the Manufacture of Wool-Dyestuffs, of which the following is a specification.

I have found that chloroamidophenolsulfonic acid obtained by sulfonating and nitrating para-dichlorobenzene, treating with alkali, and subsequently reducing may be employed for the manufacture of valuable dyestuffs by diazotizing said acid and combining it with amidonaphtholsulfonic acid G.

The process may be carried out as follows: 24.5 kilograms of para-chloro-ortho-amidophenol-ortho-sulfonate of sodium are diazotized with 7.2 kilograms of sodium nitrite and thirty kilograms of hydrochloric acid in the usual manner. The intense-yellow diazo solution thus formed is gradually added to a solution of twenty-five kilograms of amidonaphtholsulfonic acid G and thirty kilograms of sodium carbonate. The combination takes place slowly and is only complete after about twenty-four hours. The solution is then heated for a short time to 100° and salted out with common salt.

In a dry state the new dyestuff is a gray-black powder soluble in water with a blue-red color and in concentrated sulfuric acid with a red color. The dyestuff dyes wool red-brown in an acid-bath. On subsequent treatment with bichromate a blue-gray of remarkable fastness to milling and light is obtained.

Having thus described my invention, I claim as new and desire to secure by Letters Patent—

1. The herein-described process of making a dyestuff, which consists in subjecting diazotized para-chloro-ortho-amidophenol-ortho-sulfonic acid to the action of amidonaphtholsulfonic acid G, substantially as set forth.

2. As a new product, the dyestuff obtained as herein set forth, the same being, when dry, a gray-black powder, soluble in water with a blue-red color and in concentrated sulfuric acid with a red color, and dyeing wool in an acid-bath red-brown, subsequent treatment with bichromate producing a blue-gray of remarkable fastness to milling and light, substantially as set forth.

In testimony that I claim the foregoing as my invention I have signed my name in presence of two subscribing witnesses.

KARL SCHIRMACHER.

Witnesses:
HEINRICH HAHN,
ALFRED BRISBOIS.